United States Patent [19]
Aderneck

[11] Patent Number: 4,476,759
[45] Date of Patent: Oct. 16, 1984

[54] PORTABLE CHAINSAW MILLING GUIDE ATTACHMENT

[76] Inventor: Stephen E. Aderneck, Box 188, Quathiaski Cove, B.C., Canada, V0P-1N0

[21] Appl. No.: 318,432

[22] Filed: Mar. 3, 1982

[51] Int. Cl.$^3$ .................................. B27B 17/00
[52] U.S. Cl. ................................ 83/574; 83/745; 30/371
[58] Field of Search ............... 83/574, 745; 30/371

[56] References Cited

U.S. PATENT DOCUMENTS 3,864,830  2/1975  Haddon .................................. 83/745

Primary Examiner—Donald R. Schron

[57] ABSTRACT

The disclosure is of a guide which may be fitted to the cutting bar of a hand-held chainsaw, in such a manner that the chainsaw and guide may be used together for the purpose of sawing dimensioned lumber from logs. The guide is adaptable to any chainsaw of the hand-held variety. The advantages of the milling guide of the invention resides in its ability to guide the kerf of the chainsaw with relative ease, and its ability to provide leverage support to help press the cutting teeth of the chainsaw into the log, and its simplicity of operation and portability compared to other devices of this type.

1 Claim, 3 Drawing Figures

U.S. Patent  Oct. 16, 1984  4,476,759
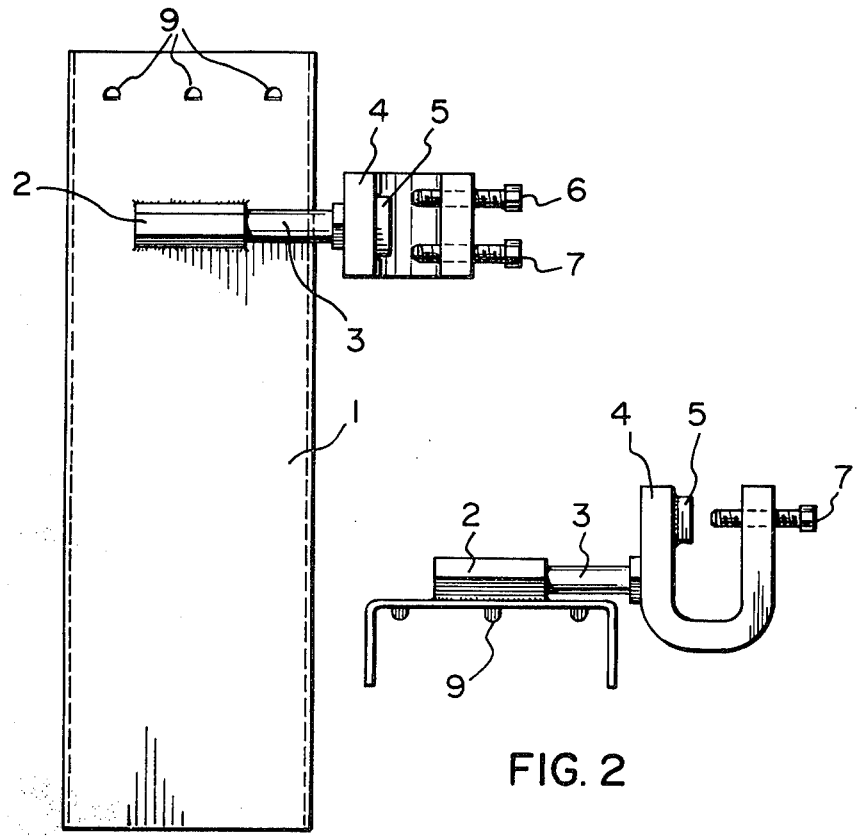
FIG. 1
FIG. 2
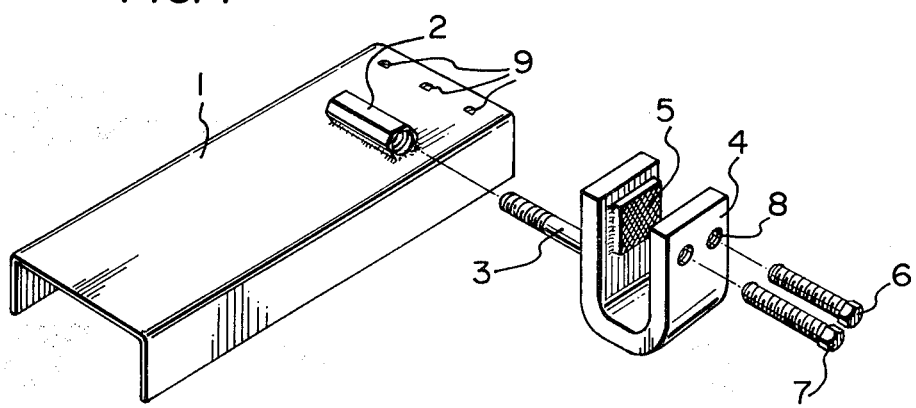
FIG. 3

PORTABLE CHAINSAW MILLING GUIDE ATTACHMENT

BACKGROUND OF THE INVENTION

1. Field of the Invention

The invention relates to saw guides and saws with guides, used for the cutting of logs into dimensional lumber.

2. Brief Description of the Prior Art

Other chainsaw guides have been invented and built. However, in typical devices of this kind there is a need for the operator of the combination chainsaw/guide to do much preparation of the log prior to installing relatively complicated guide rails and the like. Common chainsaw/guide combinations require substantial exertion to press the saw into the log. Some of these devices require the use of two operators, and some require the use of block and tackle arrangements to foster enough force on the saw bar for effective cutting.

The chainsaw guide of my invention is adapted to permit control of the saw in a relatively straight line and flat plane, with minimum exertion required.

SUMMARY OF THE INVENTION

The invention comprises a chainsaw guide and attachment device, composed of:
- an essentially rigid channel formed of metal or other suitable material.
- a threaded cylinder attached to same.
- a threaded shaft having threads matching the threaded cylinder.
- an essentially rigid clamp with two threaded holes.
- two set screws.
- a hardened backing plate with a knurled or scored surface.

BRIEF DESCRIPTION OF THE DRAWINGS

FIG. 1 is a plan view of the invention
FIG. 2 is a front view of the invention
FIG. 3 is a view of an enlarged part of section "A"

DETAILED DESCRIPTION OF THE EMBODIMENTS OF THE INVENTION

The invention comprises a rigid channel 1, which is attached, commonly by welding, to threaded cylinder 2. Threaded shaft 3 is screwed into threaded cylinder 2, and is attached, commonly by welding, to clamp 4. Hardened backing plate 5 is attached, commonly by welding, to clamp 4. Hardened set screws 6 and 7 are screwed in threaded holes 8, in clamp 4. Dog teeth 9 are formed at the formed part of channel 1.

OPERATION OF THE CHAINSAW GUIDE

A chainsaw is attached to the guide by inserting the chainsaw cutting bar in clamp 4, between backing plate 5 and set screws 6 and 7, while keeping the cutting teeth clear of the clamp 4. Set screws 6 and 7 are then turned to press the chainsaw bar against backing plate 5.

Channel 1 is allowed to rest over a suitably dimensioned wooden guide rail, such as a common 2"×4" stud, which has been nailed longitudinally to a log. The chainsaw guide combination is then placed on one end of the 2"×4" guide and the chainsaw started. By lifting on the rear handle of the chainsaw, while pressing down on the front handle of the chainsaw, the saw bar is made to press into the log, in a relatively straight line and flat plane. The dog teeth 9 are thus caused to bite into the wooded guide rail, and thereby prevent the channel 1 from sliding along the wooden guide rail. When the chainsaw has completed a cut such that the saw bar is essentially vertical, the guide 1 is slid a few inches along the wooden guide rail by the operator pulling on both handles of the chainsaw. The operation is then repeated until the full length of the log has been sawn, at which time the chainsaw/guide combination is removed from the wooden guide rail, and the wooden guide rail itself removed from the log.

The log is then revolved 90 degrees and another cut is then made in similar fashion to the first. By repeating this operation twice more, a squared timber is obtained. In like fashion, it can then be sawn into boards as desired, by nailing the wooden guide rail in suitable position.

Those skilled in the art will realize that variations to the invention can be made without departing from the scope or spirit of the invention. For example, only one, or several set screws could be used, and the position of the threaded cylinder on the cutting channel could be varied.

What is claimed is:

1. A portable chain saw milling guide attachment comprising:
   - a rigid channel-shaped guide having a flat section with two downturned flanges along opposite side edges of said flat section;
   - dog teeth formed on the underside of said flat section between the flanges;
   - an internally threaded member fixed to the top side of said flation section extending traversly to said flanges;
   - a threaded shaft having one end threadedly engaged in said internal threaded member;
   - a U-shaped clamp attached to the other end of said threaded shaft, said clamp having a serrated backing plate attached to the inside wall of one leg of the U-shaped clamp and threaded holes in the opposite leg of the U-shaped clamp;
   - screws threaded through said threaded hole cooperating with the backing plate for holding the guide bar of a chain saw in the clamp and on the attachment.

* * * * *